(12) United States Patent
Betting et al.

(10) Patent No.: US 8,226,743 B2
(45) Date of Patent: Jul. 24, 2012

(54) FLUID SEPARATOR COMPRISING A CENTRAL BODY

(75) Inventors: Marco Betting, Rijswijk (NL); Cornelis Antonie Tjeenk Willink, Rijswijk (NL); Bart Prast, Rijswijk (NL); Zvonimir Opic, Rijswijk (NL)

(73) Assignee: Twister, B.V., Rijswijk (NL)

( * ) Notice: Subject to any disclaimer, the term of this patent is extended or adjusted under 35 U.S.C. 154(b) by 423 days.

(21) Appl. No.: 12/593,117

(22) PCT Filed: Mar. 26, 2008

(86) PCT No.: PCT/NL2008/050172
§ 371 (c)(1),
(2), (4) Date: Oct. 22, 2009

(87) PCT Pub. No.: WO2008/118018
PCT Pub. Date: Oct. 2, 2008

(65) Prior Publication Data
US 2010/0147021 A1 Jun. 17, 2010

(30) Foreign Application Priority Data
Mar. 26, 2007 (EP) ..................... 07104888

(51) Int. Cl.
*B01D 45/12* (2006.01)
(52) U.S. Cl. .............. 95/32; 95/34; 62/533; 55/423; 55/434.2; 55/449; 55/459.1; 55/460
(58) Field of Classification Search ............ 55/423, 55/434.2, 449, 459.1, 460; 62/533; 95/32, 95/34
See application file for complete search history.

(56) References Cited

U.S. PATENT DOCUMENTS

| | | | | |
|---|---|---|---|---|
| 7,357,825 | B2 * | 4/2008 | Betting et al. | 55/459.1 |
| 2003/0115843 | A1 | 6/2003 | Haland | |

FOREIGN PATENT DOCUMENTS

| | | |
|---|---|---|
| GB | 711304 | 6/1954 |
| GB | 711304 A | 6/1954 |
| GB | 1233347 A | 5/1971 |
| JP | 02017921 | 1/1990 |

(Continued)

OTHER PUBLICATIONS

International Search Report dated Jul. 1, 2008 for PCT/NL2008/050172.

(Continued)

*Primary Examiner* — David A Reifsnyder
(74) *Attorney, Agent, or Firm* — Levenfeld Pearlstein, LLC (57) ABSTRACT

The invention relates to fluid separator comprising:—a throat portion (4) which is arranged between a converging fluid inlet section and a diverging fluid outlet section, the diverging fluid outlet section comprising an inner primary outlet (7) for condensables depleted fluid components and an outer secondary outlet for condensables enriched fluid components (6); and—a central body (10) provided upstream of the throat portion (4) in the fluid inlet section, the central body (10) being arranged substantially coaxial to a central axis I of the fluid separator. The fluid separator is arranged to facilitate a main flow through the converging fluid inlet section, the throat portion towards the diverging fluid outlet section. The central body (10) comprises an outlet (13), directed towards the tubular throat portion (4) and is arranged to add a central flow towards the throat portion (4).

19 Claims, 9 Drawing Sheets

FOREIGN PATENT DOCUMENTS

| | | |
|---|---|---|
| SU | 1289533 A1 | 2/1987 |
| WO | 0023757 | 4/2000 |
| WO | 03029739 | 4/2003 |
| WO | 03029739 A2 | 4/2003 |
| WO | 2006070019 | 7/2006 |
| WO | WO 2008118018 A1 * | 10/2008 |

OTHER PUBLICATIONS

International Preliminary Report on Patentability dated Jun. 2, 2009 for PCT/NL2008/050172.

Eurasian Patent Office Search Report issued Mar. 22, 2010, in connection with corresponding Patent App. No. 200970890.

* cited by examiner

FLUID SEPARATOR COMPRISING A CENTRAL BODY

CROSS-REFERENCE TO RELATED APPLICATIONS

This is a National Stage Application of International Patent Application No. PCT/NL2008/050172, filed Mar. 26, 2008, which claims the benefit of and priority to European Patent Application No. 07104888.8, filed Mar. 26, 2007, the contents of each of which are incorporated by reference herein.

TECHNICAL FIELD

The invention relates to a fluid separator comprising a throat portion which is arranged between a converging fluid inlet section and a diverging fluid outlet section, the diverging fluid outlet section comprising an inner primary outlet for condensables depleted fluid components and an outer secondary outlet for condensables enriched fluid components; and a central body provided upstream of the throat portion in the fluid inlet section, the central body being arranged substantially coaxial to a central axis of the fluid separator, the fluid separator being arranged to facilitate a main flow through the converging fluid inlet section, the throat portion directed towards the diverging fluid outlet section.

STATE OF THE ART

WO03/029739A2 describes a cyclonic fluid separator comprising a tubular throat portion in which the fluid stream is accelerated to a possibly supersonic speed and rapidly cooled down as a result of adiabatic expansion. The rapid cooling will cause condensation and/or solidification of condensables in the fluid stream into small droplets or particles. If the fluid stream is a natural gas stream emerging from a natural gas production well then the condensables may comprise water, hydrocarbon condensates, waxes and gas hydrates. These separators furthermore comprise an assembly of swirl imparting vanes in an inlet portion upstream of the throat portion, which vane or vanes are tilted or form a helix relative to a central axis of the throat portion to create a swirling motion of the fluid stream within the separator. The centrifugal forces exerted by the swirling motion on the fluid mixture will induce the relatively high density condensed and/or solidified condensables to swirl to the outer periphery of the interior of the throat portion and of a diverging outlet section whereas relatively low density gaseous components are concentrated near the central axis of the separator.

The gaseous components are subsequently discharged from the separator through a primary central outlet conduit, whereas the condensates enriched fluid stream is discharged from the separator through a secondary outlet which is located at the outer circumference of the diverging outlet section.

Figure 1:
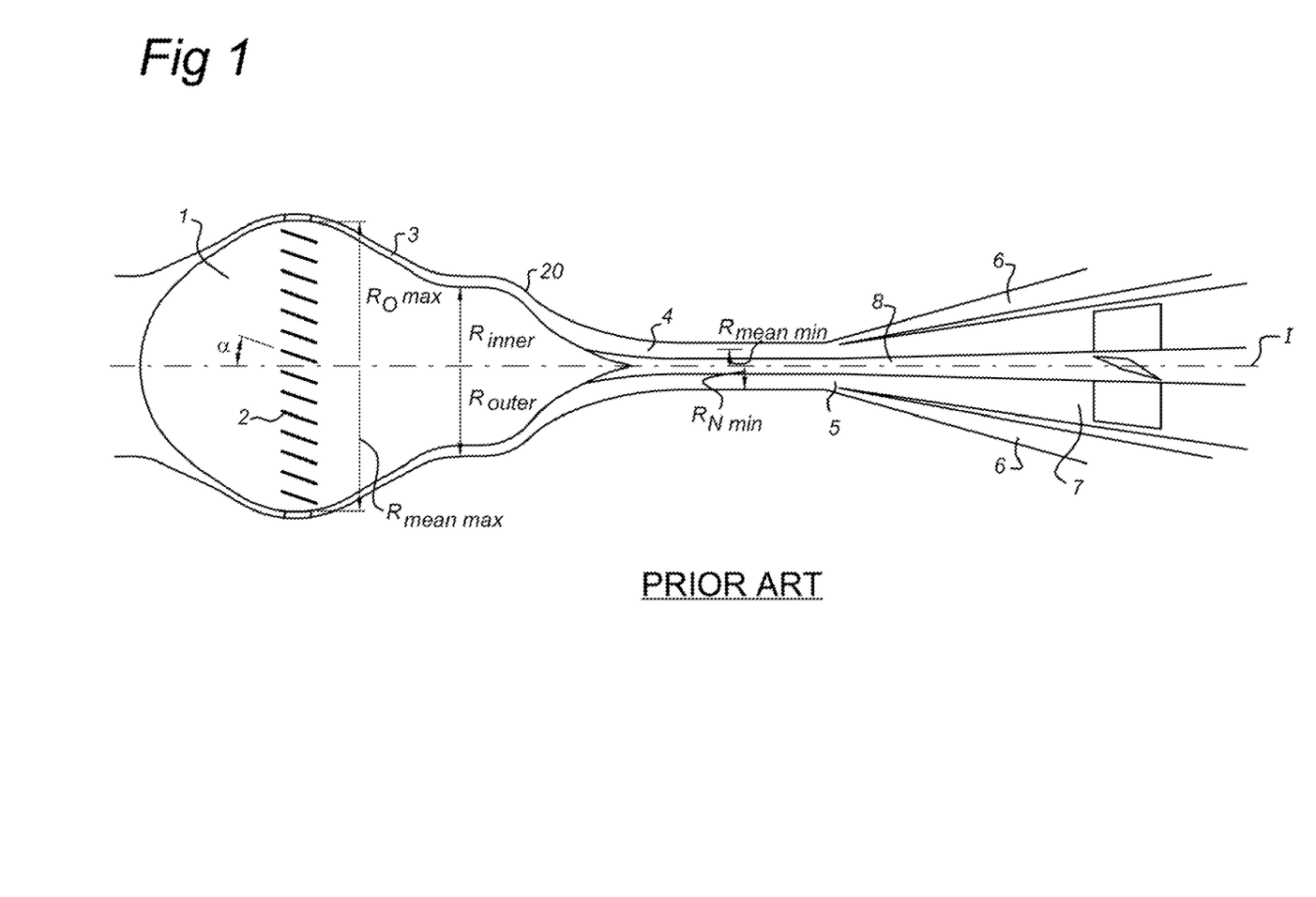
FIG. 1 schematically depicts a longitudinal sectional view of a cyclonic separator, FIGS. 2a and 2b schematically depict a cross sectional view of a cyclonic separator according to an embodiment, FIG. 3 schematically depicts a cross sectional view of a cyclonic separator according to an alternative embodiment, FIGS. 4a and 4b schematically depict a cross sectional view of a cyclonic separator according to an embodiment, FIG. 5 schematically shows a cross sectional view according to a further embodiment, FIG. 6 schematically depicts a cross sectional view in the longitudinal direction according to an embodiment, FIG. 7 schematically depicts a cross section view of part of the separator according to a further embodiment, FIG. 8 schematically depicts a cross sectional view of a cyclonic separator according to an alternative embodiment

FIG. 1 shows a cyclonic inertia separator which comprises a swirl inlet device comprising a pear-shaped central body 1 on which a series of swirl imparting vanes 2 is mounted and which is arranged coaxial to a central axis I of the separator and inside the separator such that an annular flow path 3 is created between the central body 1 and separator. The central body 1 has a substantially cylindrical elongate tail section 8.

As can be seen from FIG. 1, the central body 1 substantially extends over the length of the cyclonic inertia separator. In order to allow an unobstructed flow path 3 the central body 1 is mounted at the entrance of the separator and at the tail end part for instance by means of the flow straightening blades 9 where the fluid velocity is low. No mounting means to support the central body 1 are provided in between as this would obstruct the flow.

The elongated tail end 8—connected to the central body 1—is provided to ensure a smooth and well defined annular flow path. If no elongated tail end 8 would be provided, vortex breakdown may occur at the centre of rotation of the swirling fluid flow. The centre of rotation will substantially coincide with the central axis I. Vortex breakdown is an unsteady flow phenomenon which may occur as a result of flow instabilities rising from a rapid increase of tangential momentum relative to the axial momentum and or rising from adverse pressure gradients in the flow.

In use, the swirling fluid stream may reach super-sonic speeds. Due to its length and in reaction to the fluid stream, the central body 1 and its elongated tail end 8 may start oscillating. Oscillations of the central body 1 and its elongated tail end 8 may damage the fluid separator. To prevent oscillations, the central body 1 and its elongated tail end 8 are to be mounted tightly. Furthermore, a prestressing force or pretension load may be applied to the central body 1 and its elongated tail end 8 to prevent oscillations. A relatively high prestressing force or pretension load is needed to prevent unwanted oscillations.

A more detailed description of a fluid separator and the central body 1 is provided below with reference to FIG. 1.

The fact that the central body 1 and its elongated tail end 8 need to be mounted tightly, possibly in combination with applying a prestressing force/pretension load, is cumbersome because it requires complex clamp constructions at the outer ends of the central body 1 and elongated tail end 8. Furthermore, to transfer these large prestressing forces/pretension loads from the central body 1 to the separator requires large mounting means between these parts, inducing unwanted friction losses and flow disturbances.

It is an object to provide a fluid separator that at least overcomes one of the above mentioned problems.

SHORT DESCRIPTION

According to an aspect there is provided a fluid separator comprising:

a throat portion which is arranged between a converging fluid inlet section and a diverging fluid outlet section, the diverging fluid outlet section comprising an inner primary outlet for condensables depleted fluid components and an outer secondary outlet for condensables enriched fluid components; and a central body provided upstream of the throat portion in the fluid inlet section, the central body being arranged substantially coaxial to a central axis of the fluid separator, the fluid separator being arranged to facilitate a main flow through the converging fluid inlet section and the throat portion towards the diverging fluid outlet section, wherein the central body comprises an outlet, directed towards the tubular throat portion and arranged to add a central flow towards the throat portion.

In the fluid separator as provided, there is no need to provide an elongated tail end. Thus, the combined length of the central body and the elongated tail end is reduced, making it far less vulnerable for unwanted oscillations. The central flow is provided instead of the elongated tail end and takes over the function of the elongated tail end in preventing vortex breakdown.

SHORT DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

As an example, FIG. 1 depicts a longitudinal sectional view of a fluid separator, which in this text may be referred to as a cyclonic fluid separator, a cyclonic inertia separator.

Referring now to FIG. 1, there is shown a cyclonic inertia separator which comprises a swirl inlet device comprising a pear-shaped central body 1 on which a series of swirl imparting vanes 2 is mounted and which is arranged coaxial to a central axis I of the separator and inside the separator such that an annular flow path 3 is created between the central body 1 and separator.

The width of the annulus 3 is designed such that the cross-sectional area of the annulus gradually decreases downstream of the swirl imparting vanes 2 such that in use the fluid velocity in the annulus gradually increases and reaches a supersonic speed at a location downstream of the swirl imparting vanes.

The separator further comprises a tubular throat portion 4 from which, in use, the swirling fluid stream is discharged into a diverging fluid separation chamber 5 which is equipped with a central primary outlet conduit 7 for gaseous components and with an outer secondary outlet conduit 6 for condensables enriched fluid components. The central body 1 has a substantially cylindrical elongate tail section 8 on which an assembly of flow straightening blades 9 is mounted. The central body 1 has a largest outer width or diameter $2R_{o\,max}$ which is larger than the smallest inner width or diameter $2R_{n\,min}$ of the tubular throat portion 4.

The various components of the cyclonic fluid separator as shown in FIG. 1 are described below.

The swirl imparting vanes 2 which are oriented at an angle (a) relative to the central axis I create a circulation in the fluid stream. The angle α may be between 20° and 60°. The fluid stream is subsequently induced to flow into the annular flow area 3.

The cross-sectional surface of this area is defined as:

$$A_{annulus} = \pi(R_{outer}^2 - R_{inner}^2)$$

The latter two being the outer radius and inner radius of the annulus at a selected location. The mean radius of the annulus at that location is defined as:

$$R_{mean} = \sqrt{[\tfrac{1}{2}(R_{outer}^2 + R_{inner}^2)]}.$$

At the maximum value of the mean annulus radius $R_{mean,\,max}$ the fluid stream is flowing between the assembly of swirl imparting vanes 2 at a velocity (U), which vanes deflect the flow direction of the fluid stream proportional to the deflection angle (α) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean,\,max}$ to $R_{mean,\,min}$.

It is considered that during this annular expansion two processes occur:

(1) The heat or enthalpy (h) in the flow decreases with the amount $\Delta h = -\tfrac{1}{2} U^2$, thereby condensing those flow constituents which first reach phase equilibrium. This results in a swirling mist flow containing small liquid or solid particles.

(2) The tangential velocity component $U_\phi$ increases inversely with the mean annulus radius substantially in accordance with the equation $$U_{\phi,final} = U_{\phi,initial}(R_{mean,\,max}/R_{mean,\,min}).$$

This results in a strong increase of the centrifugal acceleration of the fluid particles $(a_c)$, which will finally be in the order of:

$$a_c = (U_{\phi,final}^2 / R_{mean,\,min}).$$

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing 20, which is called the separation area. The time period for the particles to drift to this outer circumference of the flow area determines the length of the tubular throat portion 4. It is understood that particles may include solid or solidified particles.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components are discharged into an outer secondary fluid outlet 6 via one or a series of slots, (micro) porous portions whereas the 'dry' gaseous components are discharged into the central primary fluid outlet conduit 7.

In the diverging primary fluid outlet conduit 7 the fluid stream is further decelerated so that the remaining kinetic energy is transformed into potential energy.

The diverging primary outlet conduit may be equipped with an assembly of flow straightening vanes 9 to recover the circulation energy.

EMBODIMENTS

Figure 2A:
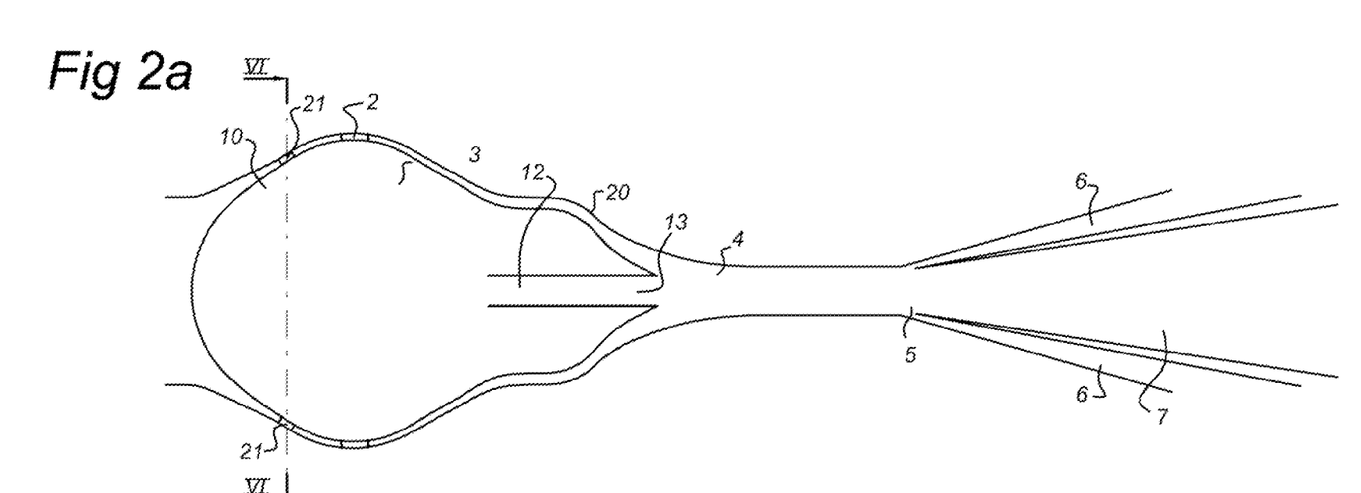

FIG. 2a shows a cross sectional view of a fluid separator according to an embodiment. Same reference numbers are used to denote same items as above. Again, a pear-shaped central body 10 on which a series of swirl imparting vanes 2 are mounted is provided. The central body 10 is arranged coaxial to a central axis I of the fluid separator and inside the separator such that an annular flow path 3 is created between the central body 10 and separator. The fluid flow entering the fluid separator through this annular flow path will be referred to as the main flow. The fluid separator further comprises a tubular throat portion 4, a diverging fluid separation chamber 5 which is equipped with a central primary outlet conduit 7 for gaseous components and with an outer secondary outlet conduit 6 for condensables enriched fluid components.

According to this embodiment, the central body 10 does not comprise an elongated tail section 8 as in FIG. 1. Instead thereof, the central body 10 comprises an outlet 13. The outlet 13 is positioned on the downstream side of the central body 10, directed towards the throat portion 4. The position and direction of the outlet 13 substantially coincides with the central axis I. The outlet 13 is arranged to add a central flow to the cyclonic fluid separator 1. The outlet 13 may also be referred to as a central outlet 13.

So, according to this embodiment, there is provided a fluid separator comprising:

a throat portion 4 which is arranged between a converging fluid inlet section and a diverging fluid outlet section, the diverging fluid outlet section comprising an inner primary outlet 7 for condensables depleted fluid components and an outer secondary outlet for condensables enriched fluid components 6; and a central body 10 provided upstream of the throat portion 4 in the fluid inlet section, the central body 10 being arranged substantially coaxial to a central axis I of the fluid separator, the fluid separator being arranged to facilitate a main flow through the converging fluid inlet section, the throat portion 4 towards the diverging fluid outlet section, wherein the central body 10 comprises an outlet 13, directed towards the tubular throat portion 4 and arranged to add a central flow towards the throat portion 4. The outlet 13 is provided upstream with respect to the throat portion 4.

A duct 12 may be provided to provide the outlet 13 with a fluid flow. An example will be described below with reference to FIG. 8.

In use, the central flow substantially coincides with the central axis I and is surrounded by the main flow. The central flow may be a swirling flow.

The central fluid flow provided by the outlet 13 ensures that the main flow remains stable throughout the fluid separator. The central flow plays a role similar to the substantially cylindrical elongate tail section 8 as described above with reference to FIG. 1 in that the central flow prevents vortex breakdown at the central axis of main flow.

Since the central flow is not a rigid object (as tail section 8) and moves in the same direction as the main flow, friction between the central flow and the main flow is relatively low. This contributes to the throughput of the fluid separator.

According to an embodiment, the fluid separator comprises a swirl imparting device 2 for creating a swirling motion of the main flow within at least part of the fluid separator. An example of such a swirl imparting device are swirl imparting vanes 2 as shown in FIG. 2 and already discussed above with reference to FIG. 1.

The central body 1 may have a substantially circular shape in a cross-axial direction and comprises upstream of the swirl imparting device 2 a nose section of which the diameter gradually increases such that the degree of diameter increase gradually decreases in downstream direction, and the central body 10 further comprises downstream of the swirl imparting device a section of which the diameter gradually decreases in downstream direction. This is shown in FIG. 2a, showing a substantially pear-shaped central body 10.

The fluid separator may comprise a housing 20 in which the central body 10 is arranged such that an annulus 3 is present between an inner surface of the housing 20 and an outer surface of the central body 10.

Figure 2B:
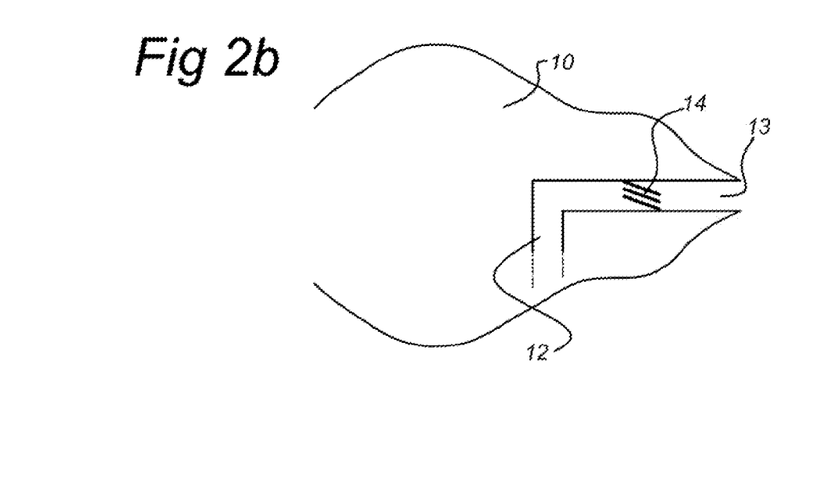

The fluid separator may comprise an outlet 13 which comprises a swirl imparting device for creating a swirling motion of the central flow within at least part of the fluid separator. This is schematically shown in FIG. 2b, showing a cross sectional view of the central body 10 according to an embodiment. The swirl provided to the central flow may be lower than the swirl of the main flow (i.e. less rotations per second or less rotations per traveled distance in the direction of the central axis I, such that no vortex breakdown of the central flow occurs). By adding a swirl to the central flow, the velocity gradient in the tangential direction between the central flow and the main flow is reduced.

For instance, the entrance velocity in axial (i.e. longitudinal) direction of the central flow is relatively low, typically 20 m/s and 0-20 m/s in tangential direction, whilst at that point the main flow velocity is high though possibly still subsonic, for instance 250 m/s axial and 100 m/s tangential. However, the main flow may already be supersonic at this point.

Hence, the central flow momentum will be propelled by the outer main flow in both axial and tangential direction (like the working principle of a jet pump/gas ejector). Now, the function of the prior art elongated tail end 8 (i.e. to prevent further tangential acceleration causing vortex breakdown) is replaced by the gaseous central flow. Instead of frictional dissipation of momentum at the boundary of the elongated tail end 8, part of the main flow momentum is used (i.e. transferred) to propel the central gas flow.

Optionally, the central flow is taken from the slip gas stream exiting the secondary outlet conduit 6 of the liquid enriched outlet flow.

According to an embodiment the swirl imparting device is formed by one of a number of swirl imparting vanes 14, e.g. a turbine, a tangential inlet etc. A tangential inlet may for instance be formed by a tangential connection between duct 12 and outlet 13. The tangential connection may be formed in such a way that the central flow is provided with a swirl, for instance by connecting duct 12 tangentially to the perimeter of the outlet 13. Of course, a combination of the mentioned swirl imparting devices may be provided.

The swirl imparting device in the outlet 13 may be formed to provide the central flow with a swirl or rotation in the same direction as the central flow, also referred to as co-current mode.

According to an alternative, the swirl imparting device in the outlet 13 may be formed to provide the central flow with a swirl or rotation in the opposite direction as the central flow, i.e. a counter current mode. A counter current mode may be considered to progressively dissipate the tangential momentum in the main flow.

Figure 6:
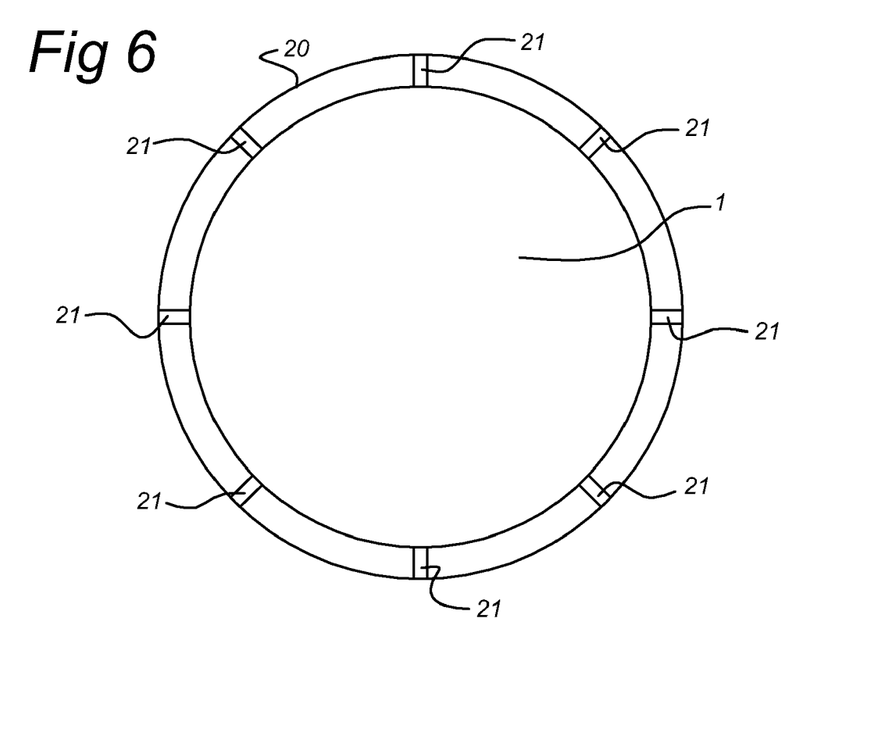

A number of spokes 21 may be provided between the housing 20 and the central body 10, to mount the central body 10. For reasons of clarity, spokes 21 are only shown in FIGS. 2, 6 and FIG. 8, but it will be understood that the spokes 21 may be present in all embodiments. FIG. 6 shows a cross sectional view along dashed line VI-VI, showing central body 10 surrounded by separator housing 20, in which eight spokes 21 are provided to mount the central body 10. Of course any other suitable number of spokes 21 may be provided, such as four, five, six, seven or eleven spokes 21.

So, there is provided a fluid separator comprising a housing 20 in which the central body 10 is mounted by a number of spokes 21.

According to an embodiment, the spokes 21 are provided upstream of the swirl imparting means 2, such that the spokes 21 have less effect on the main flow.

According to an alternative, the swirl imparting means 2 and the spokes 21 are integrated into a single part.

Figure 3:
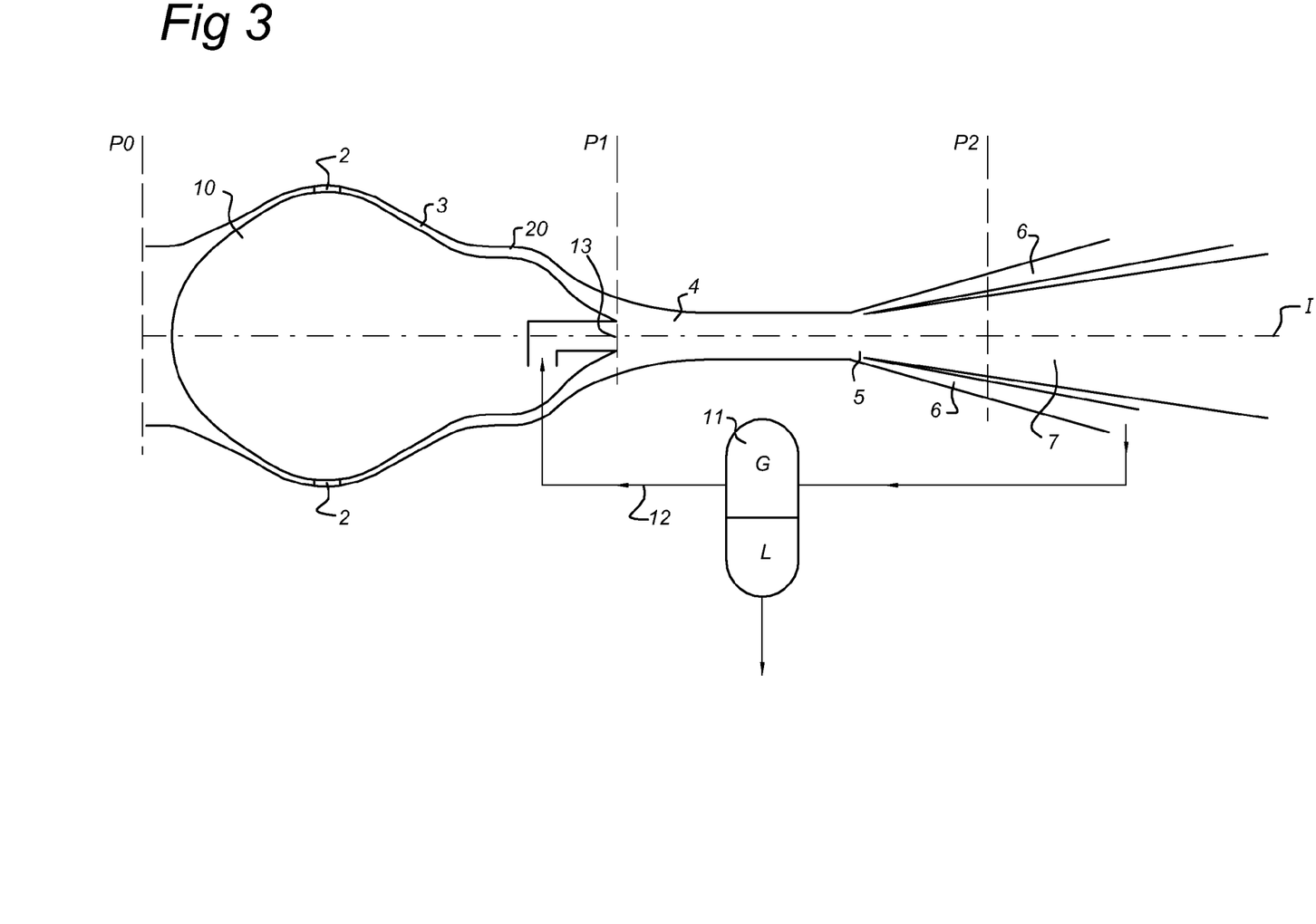

According to an embodiment, as shown in FIG. 3a, the central flow may be taken from a gas-liquid reservoir 11. The gas-liquid reservoir 11 may be connected to and fed by the secondary outlet conduit 6 of the fluid separator.

The secondary outlet conduit 6 feeds the gas-liquid reservoir 11 with condensables enriched fluid components, and thus mainly comprises liquids and/or solids that are separated from the fluid flow by the cyclonic fluid separator. This liquid L is collected in the gas-liquid reservoir 11. Gaseous components G may be present in the gas-liquid reservoir 11, as the secondary outlet conduit 6 may also comprise gaseous components. Also, the liquid L in the gas-liquid reservoir 11 may evaporate forming gaseous components G. Therefore, the gas-liquid reservoir 11 may be equipped with means for separation the liquid fraction from the gas fraction. Suitable separation means can comprise: swirl tubes, mist mats, vane-type demisters etc.

Alternatively the outer secondary outlet 6 of the fluid separator may be connected tangentially to the cross section perimeter of the gas-liquid reservoir 11 in order to create a rotational flow (vortex) inside the gas-liquid reservoir. Due to the inertia forces the dispersed liquid phase is transported in radial direction to the circumference of the gas-liquid reservoir 11 where it can settle under gravity force to the liquid collection zone in the bottom of said gas-liquid reservoir.

So, according to an embodiment, the outer secondary outlet 6 is connected to the gas-liquid reservoir 11 from which a fluid flow is guided to the outlet 13 to form the central flow. This is an efficient way of generating the central flow.

The fluid provided by the secondary outlet conduit 6 may comprise gaseous components that were supposed to leave the fluid separator via the primary outlet conduit 7. Also, the liquid L that is provided by the secondary outlet conduit 6 may comprise components that are accidentally captured by the formed liquid. These components will typically be light components (methane, ethane, propane), which evaporate easily from the liquid L in the gas-liquid reservoir 11. These fractions of evaporated components are guided from the gas-liquid reservoir into inlet 12 and subsequently introduced in the fluid separator via outlet 13, of which the condensable fraction will again be condensed in the throat portion 4 and can be separated in second instance.

To facilitate the evaporation of liquid L in the liquid-gas reservoir 11, or to melt solidified components entering the gas-liquid reservoir, a heating device may be provided to heat the contents of the gas-liquid reservoir 11. This is done either to evaporate at least some of the liquid components present in the liquid-gas reservoir 11 forming gaseous components or to at least increase the amount of gaseous components in the gas-liquid reservoir 11 to be supplied to the outlet 13.

A fluid separator is therefore provided, wherein the gas-liquid reservoir 11 is arranged to be heated.

In FIG. 3 three pressure symbols are depicted: P0, P1 and P2. P0 represents the pressure upstream of the central body and may typically be in the order of 100 bar. P1 represents the pressure at the position of the outlet 13 and may typically be 50% lower than P0 though at least lower than P2. P2 represents the pressure at the position of the secondary outlet conduit 6 and may typically be 25%-50% lower than the inlet pressure P0. It will be understood that the values of the pressures P0, P1, P2 may vary depending on the pressure supplied to the fluid separator and the actual shape of the fluid separator and central body. However, typically the following relation applies: P0>P2>P1.

So, in use, the outlet 13 is at a first pressure P1 (i.e. the space to which the outlet 13 supplies the central flow is at the first pressure P1) and the secondary outlet conduit 6 is at a second pressure P2, the first pressure P1 being lower than the second pressure P2. This ensures that the fluid flow from the gas-liquid reservoir 11 automatically flows from the gas-liquid reservoir 11 to the outlet 13 and into the fluid separator. So, no additional pumps or specially provided high pressure reservoirs are needed.

Figure 4A:
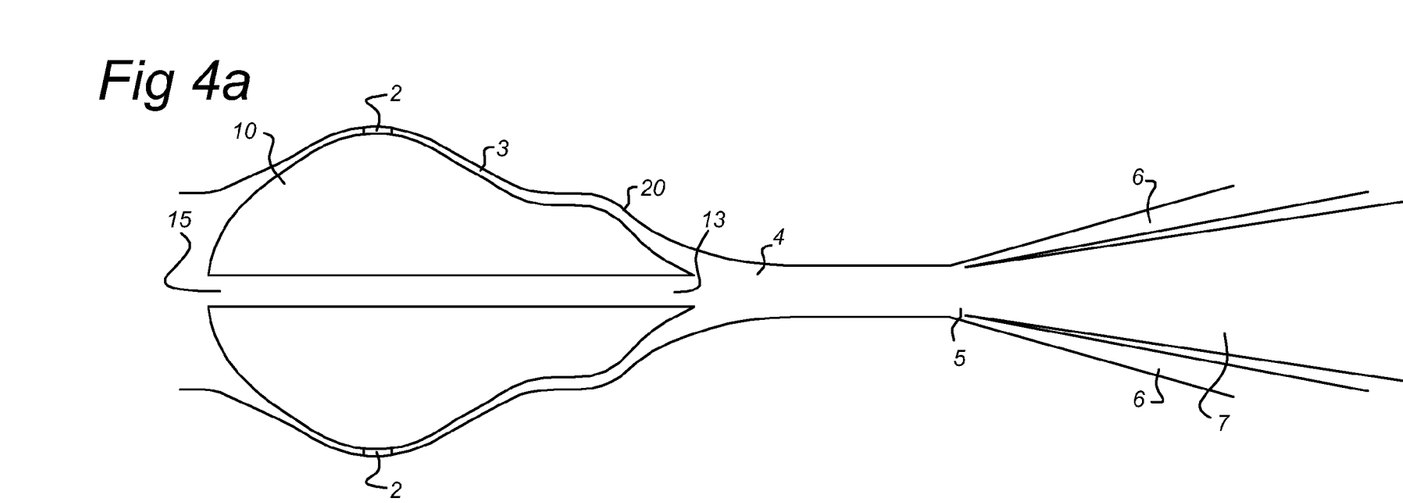

FIG. 4a schematically depicts a further embodiment. According to this embodiment, the central body 10 is provided with an inlet 15 substantially facing the upstream direction. From the inlet 15 a fluid flow is guided to the outlet 13 to form the central flow. The inlet 15 may be provided in the nose section of the central body 10. This is an easy way of generating a central flow.

Figure 4B:
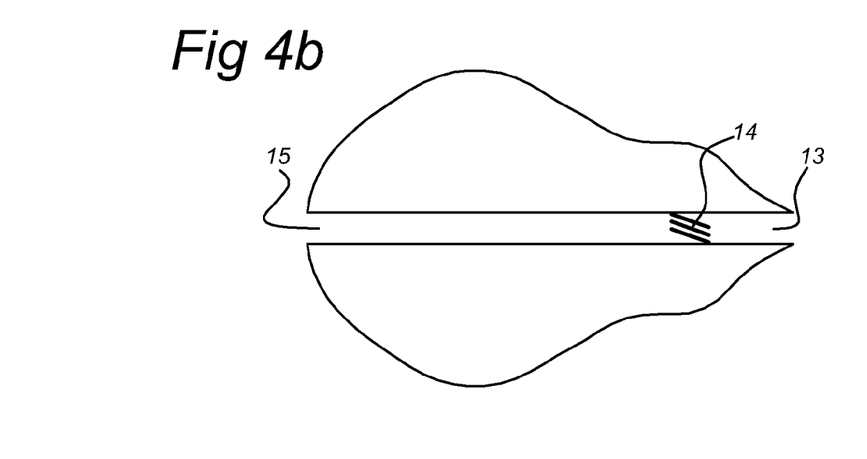

Again, as shown in FIG. 4b, the outlet 13 may be provided with a swirl imparting device, such as swirl imparting vanes 14, as described above with reference to FIG. 2b.

Figure 5:
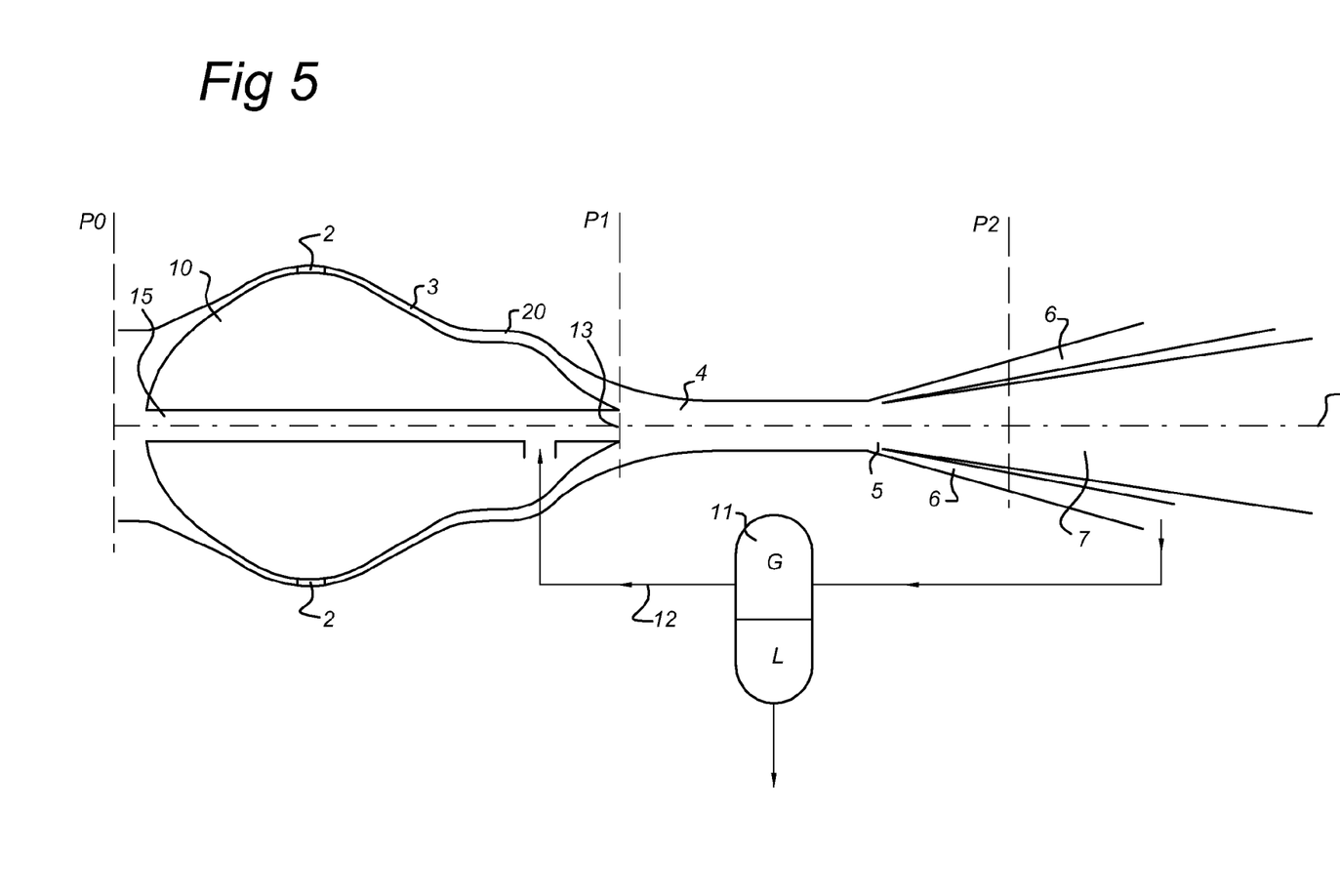

FIG. 5 shows a combination of the embodiments described and depicted in FIGS. 3 and 4a.

As described with reference to FIG. 1, according to the state of the art, flow straightening blades 9 were provided on the elongated tail end 8. However, in the embodiments described here, no elongated tail section 8 is present.

Figure 7:
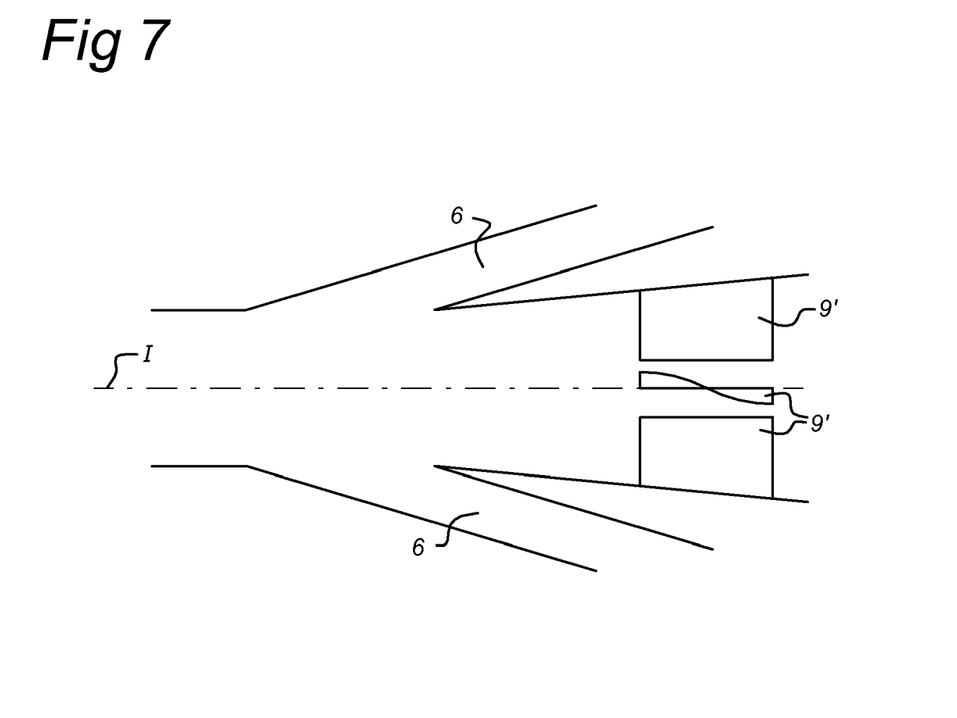

Therefore, a flow straightening device, such as flow straightening blades 9' may be provided that is mounted to the separator housing 20. An example of this is shown in FIG. 7.

Figure 8:
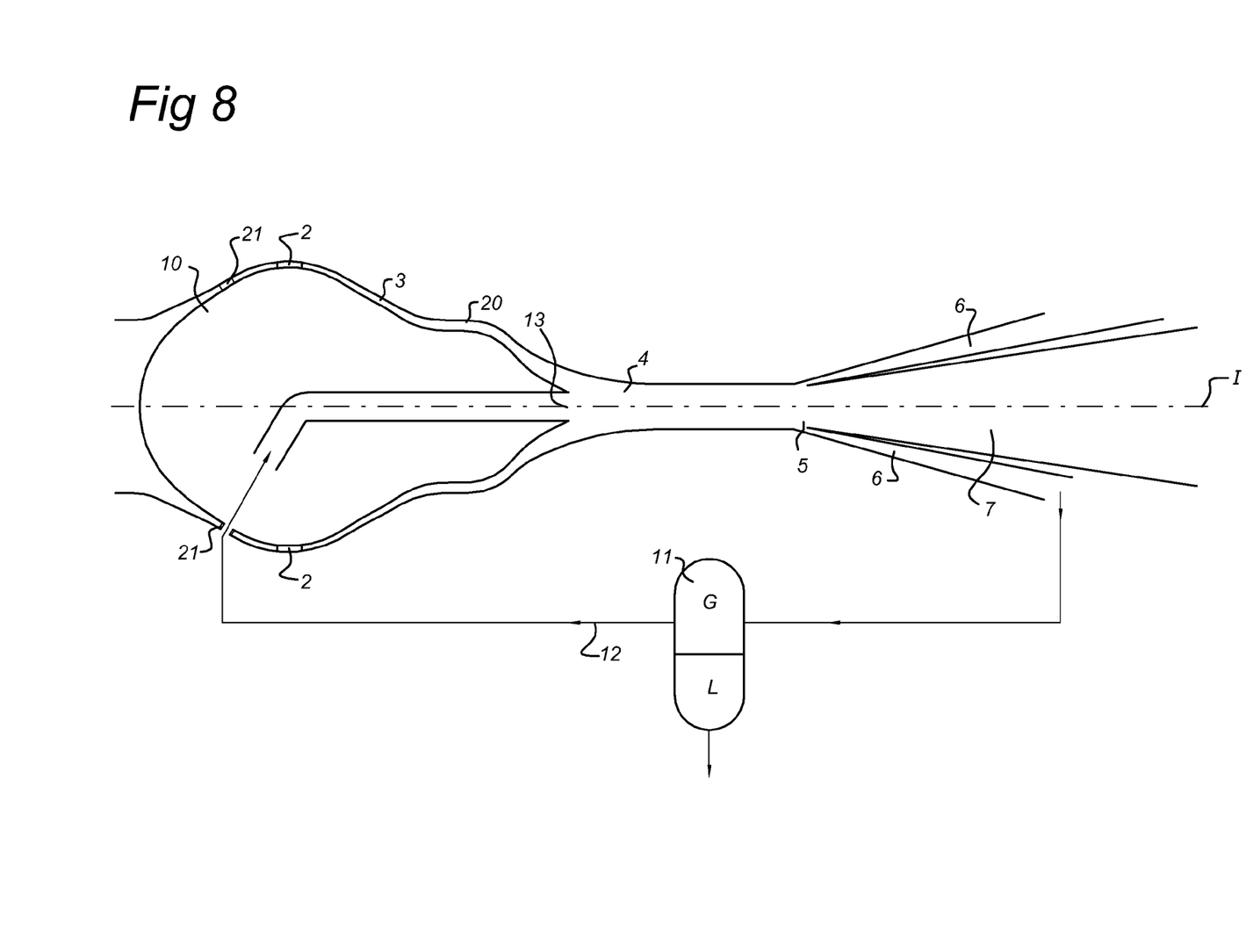

One or more of the spokes 21 may be hollow and connected to the fluid inlet 12 as to guide the flow to outlet 13, as schematically shown in FIG. 8. According to an embodiment, there is provided a fluid separator, wherein the fluid flow is guided to the outlet 13 via a duct 12 that enters the central body 10 via at least one of the spokes 21. According to FIG. 8, the fluid flow may be taken from the gas-liquid reservoir, but it will be understood that the fluid flow may also be taken from another source.

As described above, the central flow may be taken from any suitable source. So, according to an embodiment, the fluid separator may be arranged to provide a central flow comprising at least one of an absorbent medium and a coolant medium.

So, accordingly, there is provided a method of separating a fluid mixture using a fluid separator as described above. The method may comprise providing a first fluid to form the main flow, providing a second fluid to form the central flow.

The second fluid may comprise at least one of an absorbent medium and a coolant medium. An absorbent may be selected and deployed as a solvent which selectively reduces the vapor pressure of a particular vapour component of interest. A coolant medium can be used to improve the overall thermal efficiency of the expansion extending throughout the throat portion 4 up to the diverging fluid separation chamber 5, by mixing the coolant medium with the main feed stream.

Further Remarks

Aspects of the above embodiments were described in European patent application with application number 07104888.8 from which priority is claimed and are described below.

07104888.8 identified that the fluid mixture that flows at high velocity through the annular space between the inner surface of the housing and the outer surface of the central body may exert vibrating forces on the housing and the central body.

It is also desired to streamline the central body, which may involve configuring the central body such that is has a droplet shaped front section and an elongate slender tail section. This tail section may be short or long and may be supported or unsupported by the housing. Vibrations of the central body may have a detrimental effect on the fluid flux and separation performance of the device and may damage and even cause failure of the central body.

It is an object to solve the problem of vibration of the central body of a cyclonic fluid separator.

Figure 10:
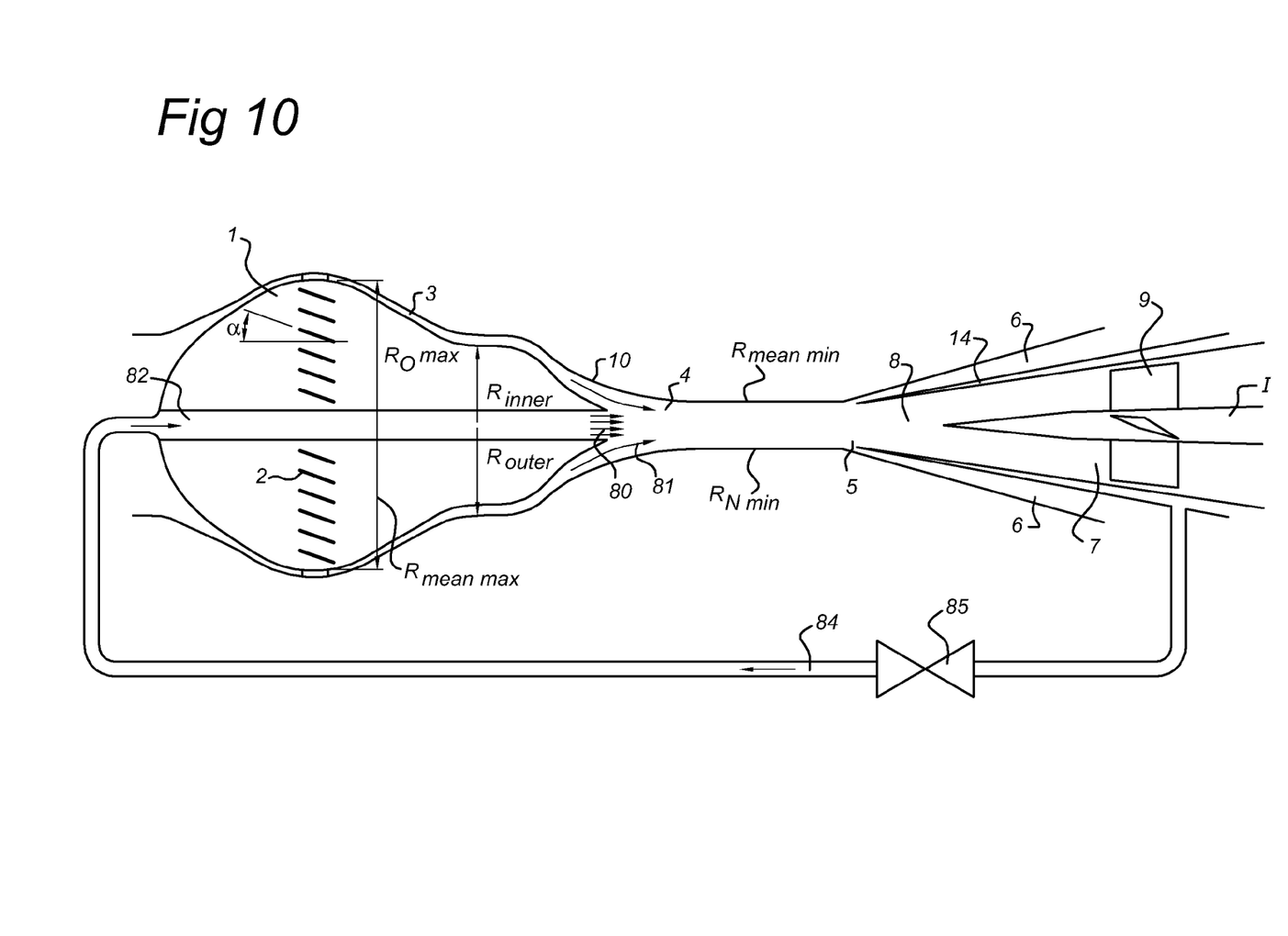
FIG. 10 is a schematic longitudinal sectional view of a cyclonic fluid separator with a central body having a central opening through which a fluid is injected to inhibit fluid induced vibrations.

By extending the central body 1 with an elongated tail section 8, the steep increase of tangential momentum towards the central axis of the vortex flow, is restricted thereby avoiding flow instability (i.e. vortex break down). The presence of the centrally placed droplet-shaped central body 1 with elongated tail section 8 is beneficial to provide a supersonic cyclonic separator with high separation efficiency. High separation efficiency is obtained through maximizing the angular momentum in the flow. However increasing the angular momentum is limited by the occurrence of vortex breakdown. The latter strongly diminishes the angular momentum. The droplet shaped central body 1 allows for an increase of angular momentum in the cross section flow—compared to a flow area without central body—without the occurrence of vortex breakdown. Alternatively said restriction provided by the elongated tail end section can be obtained by injecting a low pressure fluid through a longitudinal opening (outlet 13) at the end of the droplet shaped central body as shown in FIG. 10.

Considering a central body 1 comprising an elongated tail end section 8, centrally placed in a cylindrical flow duct in which a flow is established. An infinitesimal small displacement from an initial radial position $r=(x0, y0)$ to a new radial position $r=(x1, y1)$, will cause the flow to accelerate in the part of the flow cross-section where the central body has been displaced to, and decelerate in the part of the flow cross section from which the central body 1 was displaced. Clearly the resulting static pressure difference will generate a lift force, which by definition is normal to the surface of the central body 1. This normal force will cause further bending, leading to a new radial position $r=(x2, y2)$ etc. etc. The magnitude of the final displacement is a result of the flow force (i.e. normal force) on one hand, counteracted by the bending stiffness of the central body 1 (i.e. reaction force per unit displacement) on the other hand. If the bending stiffness of the central body 1 is sufficiently high, the resultant force has a direction opposite to the direction of displacement, for which holds that the central body structure behaves as a mass-spring system. If however the bending stiffness is insufficient the resultant force is in the direction of the displacement and the central body 1 will be displaced towards the boundary of the housing 10 or until material rupture due to a load beyond the ultimate strength limit. The bending stiffness will merely depend on: Moments of Inertia (i.e. central body shape), Modulus of Elasticity of the material (E) and the Pretension Force imposed on the central body 1.

Forces exerted by the swirling fluid flux on the central body 1 can be calculated as follows.

Considering a central body 1 centrally placed in a cylindrical flow duct but now with a vortex flow present. An infinitesimal small displacement from an initial radial and tangential position $[r,\phi]=(x0, y0)$ to a new position $[r,\phi]=[x1, y1]$, will not only cause a force normal to the central body surface, but also a force tangent to the central body surface which causes a disposition in tangential direction. This tangential movement of the central body is not restraint by its bending stiffness—which only works in radial direction—hence an ongoing pivoting movement of the central body results. To avoid an increasing pivoting motion, a dampening mechanism is required to stabilize the central body.

Summarizing the above, a static stable central body 1 behaves like a mass-spring system and hence will oscillate in a harmonic mode at its natural frequency as long as the flow is exciting the central body 1. The corresponding amount of free resonance energy needs to be removed from the system (i.e. needs to be dissipated). Therefore a dampening mechanism is required to obtain dynamic stability. Alternatively the mass-stiffness of the central body structure can be increased to the point that its natural frequency becomes so high that the period of the oscillation is small compared to the retention time of gas flow. In that case the flow will not exert a defined lift force on the central body 1, which hence is not excited. In addition the lift forces on the central body 1 can be suppressed by radially oriented openings throughout the central body cross section balancing the pressure between lower and upper side.

Suitable ways to support the droplet shaped central body 1 with an elongate tail section 8 such that vibrations are inhibited are described herein below.

Figure 9:
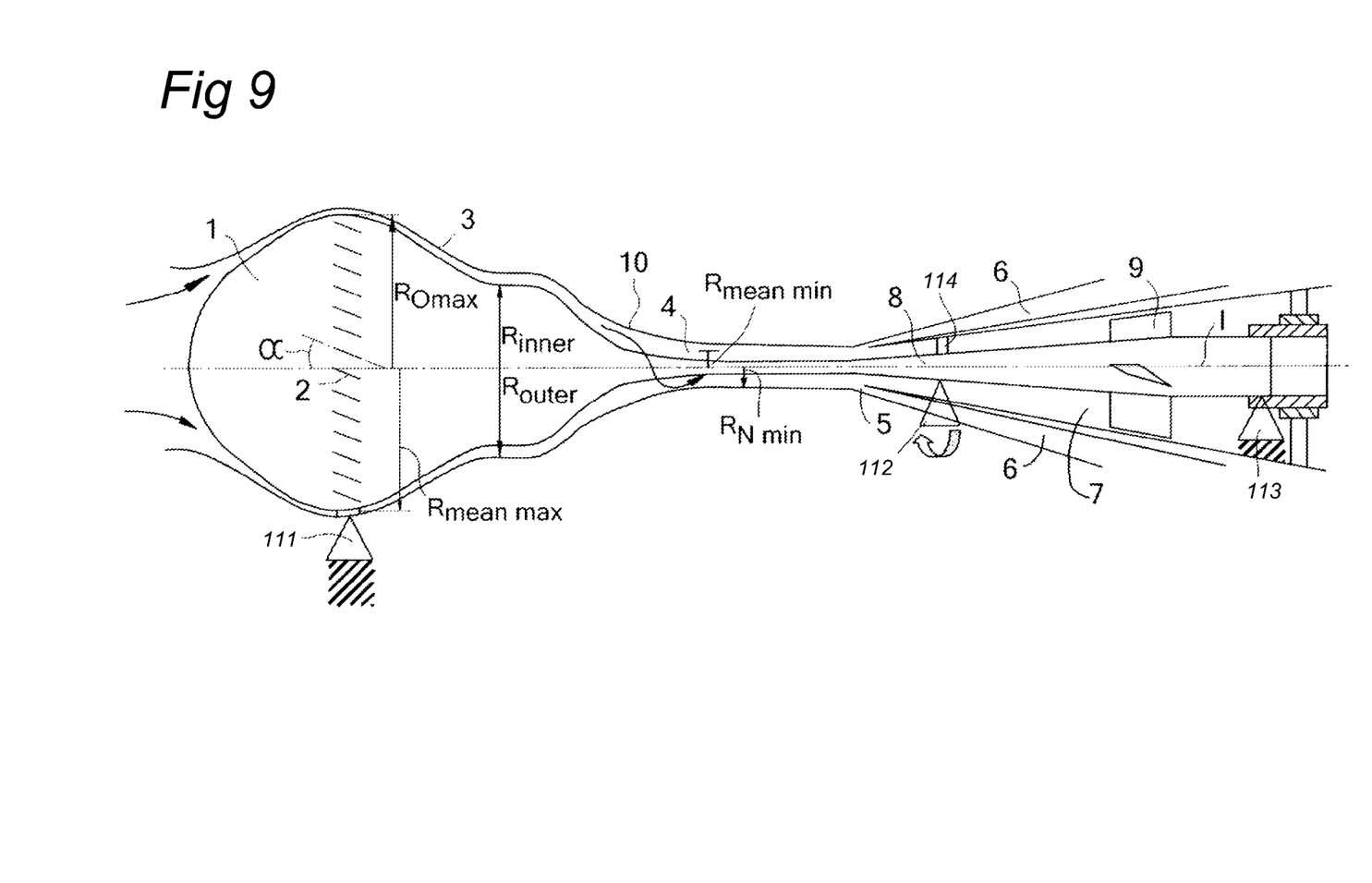
FIG. 9 is a schematic longitudinal sectional view of a cyclonic separator with a central body having an elongate tail section.

In the embodiment shown in FIG. 9 the swirl imparting vanes 2 and the de-swirling vanes 9 support the central body 1 with an elongated tail section 8 within the tubular separator housing 10. Since the swirl imparting vanes 2 and de-swirling vanes 9 protrude into the fluid flow, it is preferred to place these in the low speed areas of the flow (<200 m/s) as to avoid unnecessary pressure loss. The triangles 111, 112, and 113 show how in the supersonic cyclonic separator shown in FIG. 9 the droplet shaped central body 1 with elongated tail section 8 may be supported within the tubular separator housing 10:

1) a fixed support 111 is provided by the swirl imparting vanes 2, 2) a radial restraint support 112 is provided by spacer ribs 114 in the dry gas outlet conduit 7, and 3) a fixed support 113 in the dry gas outlet conduit 7 downstream of the de-swirling vanes 9.

By choosing the support types and support locations for a given central body geometry, its mode shape is determined as well as its moments of inertia. The number of support points can be any number larger than or equal to 2 depending on the specific geometry of the supersonic cyclonic separator.

By applying a pretension load (or prestressing force) on the central body 1 with elongate tail section 8 the bending stiffness increases i.e. the static stability increases and therefore its natural frequency increases. It will be understood that increasing the natural frequency of the central body will also enhance the actual dampening. Since the pretension load can go up to an average tensile stress of 5000 MPa in the cross section of the tail section 8 of the central body 1. In the case of a high pretension load >1000 MPa, it is preferred to avoid thread connections.

FIG. 10 shows an embodiment of the cyclonic separator according to the invention wherein the functionality of elongated tail section 8 of the separators shown in FIGS. 1 and 9 is replaced by injecting a low pressure fluid 80 through a central opening 82 (outlet 13) of the central body 1 into the core of the vortex 81 flowing through the tubular housing 10 of the separator. A swirling motion can be imposed to the low pressure fluid prior to injection via the central opening 82 (e.g. using swirl imparting device formed by one of a number of swirl imparting vanes 14, a turbine, a tangential inlet). This swirling motion can be either co-current or counter-current to the swirling motion of the high pressure flow.

A counter current mode may be considered to progressively dissipate the tangential momentum in the main swirling flow, albeit the co-current mode is in general the preferred mode.

The entrance momentum of the low pressure fluid 80 (central flow) will be low compared to the momentum of the high pressure flow 81 (main flow) passing along the outer surface of the central body 1. Extensive momentum exchange will occur in the elongate tubular fluid separation section 4 of the device where the low pressure fluid 80 (central flow) is propelled by the high pressure swirling fluid 81 (main flow). Likewise the central body 1, tangential momentum in the high pressure swirling fluid 81 (central fluid) is limited by the presence of a low momentum flow (central flow) in the core of the tube section 4. As the swirling high pressure fluid flux 81 (main flow) will loose tangential momentum, the low pressure fluid flux 80 (central flow) will gain tangential momentum. The low pressure fluid flux 80 (central flow) in total will mix with the swirling high pressure fluid flux 81 (central flow) and be accelerated in the tubular separation section 4.

The liquids formed by nucleation and condensation will be offered sufficient retention time in the tubular separation section 4 that these are separated in the vortex flow to the outer periphery of the tube.

The low pressure fluid may be a fraction of the liquid enriched 'wet' fluid flowing from the annular wet gas exhaust conduit 6, which is recirculated into the opening 82 (outlet 13) within the central body 1 via wet gas recycling conduit 84. The wet gas recycling conduit 84 is equipped with a control valve 85 to control the low pressure fluid flow rate 80 (central flow) such that is between 5 and 80% of the fluid flow rate of the high pressure fluid 81 (main flow). It is preferred that the low pressure fluid flow rate 80 (central flow) is between 25 and 60% of the high pressure fluid flow rate (main flow).

In an embodiment of the cyclonic fluid separator the central body comprises a longitudinal opening (outlet 13) having a longitudinal axis which substantially coincides with the central axis, which longitudinal opening is configured as a duct through which in use a low pressure fluid (central flow) is injected into the tubular housing, which low pressure fluid is mixed with the fluid flowing through the throat section in a substantially cylindrical section of the housing that is located downstream of the throat section and which low pressure fluid (central flow) has a lower static pressure than the fluid flowing via the throat section into the substantially cylindrical section of the housing.

In such case the tubular housing may comprise a tail section in which a central gas enriched fluid outlet is arranged, which is surrounded by an annular liquid enriched fluid outlet and wherein a recycle conduit is arranged between the annular liquid enriched fluid outlet and the longitudinal opening in the central body for recycling liquid enriched fluid as a low pressure fluid from the annular liquid enriched fluid outlet into the longitudinal opening in the central body.

The throat section of the cyclonic fluid separator according to the invention may be configured such that in use the fluid is accelerated to a substantially sonic or supersonic velocity in the throat section and thereby cooled such that one or more condensable components condense in the throat section.

In accordance with the invention there is also provided a method of separating a fluid mixture with the separator according to the invention, wherein the method is used to obtain a purified natural gas stream from a contaminated natural gas stream comprising solid contaminants, such as sand and/or other soil particles and/or condensable contaminants, such as water, condensates, carbon dioxide, hydrogen sulphide and/or mercury.

According to an embodiment, there is provided a cyclonic fluid separator with a tubular housing in which the fluid is accelerated and swirl imparting means for inducing the fluid to swirl through an annular space between the housing and a central body mounted within the housing, which central body is provided with resonance abatement means, wherein the central body comprises a droplet shaped section, which has a longitudinal axis of symmetry which is substantially co-axial to a central axis of the tubular housing, such that an annular fluid channel is created between the outer surface of the central body and the inner surface of the tubular housing, in which annular fluid channel a series of swirl imparting vanes are arranged, which swirl imparting vanes are arranged around a large diameter mid section of the droplet shaped section and which annular fluid channel provides a throat section which is arranged around a section of the central body having a smaller outer diameter than the mid section of the central body.

According to an embodiment, the central body comprises a longitudinal opening having a longitudinal axis which substantially coincides with the central axis, which longitudinal opening is configured as a duct through which in use a low pressure fluid is injected into the tubular housing, which low pressure fluid is mixed with the fluid flowing through the throat section in a substantially cylindrical section of the housing that is located downstream of the throat section and which low pressure fluid has a lower static pressure than the fluid flowing via the throat section into the substantially cylindrical section of the housing.

According to an embodiment the duct in the central body comprises swirl imparting vanes for inducing the low pressure fluid to flow into the throat section in either a co-current or counter-current direction relative to the swirling motion of the high pressure fluid.

According to an embodiment the tubular housing comprises a tail section in which a central gas depleted fluid outlet is arranged, which is surrounded by an annular liquid enriched fluid outlet and wherein a recycle conduit is arranged between the annular liquid enriched fluid outlet and the longitudinal opening in the central body for recycling liquid enriched fluid as a low pressure fluid from the annular liquid enriched fluid outlet into the longitudinal opening in the central body.

According to an embodiment the throat section is configured such that in use the fluid accelerated to a substantially sonic or supersonic velocity in the throat section and thereby cooled such that one or more condensable components condense in the throat section.

According to an embodiment the cyclonic fluid separator comprises resonance abatement means comprising a low pressure fluid 80 injected through a central opening 82 in the central body 1.

The descriptions above are intended to be illustrative, not limiting. Thus, it will be apparent to one skilled in the art that modifications may be made to the invention as described without departing from the scope of the claims set out below.

The invention claimed is:
1. A fluid separator for separating a fluid, the fluid separator comprising:
 a throat portion which is disposed between a converging fluid inlet section and a diverging fluid outlet section, the diverging fluid outlet section comprising an inner pri- mary outlet for condensables depleted fluid components and an outer secondary outlet for condensables enriched fluid components;

a central body disposed upstream of the throat portion and in the converging fluid inlet section, the central body being disposed substantially coaxial to a central axis of the fluid separator, wherein the central body has a largest outer width or diameter which is larger than a smallest inner width or diameter of the throat portion; and a swirl imparting device for creating a swirling motion of a main flow within at least part of the fluid separator, wherein the fluid separator further comprises a housing in which the central body is disposed such that an annulus is present between an inner surface of the housing and an outer surface of the central body, wherein the fluid separator is configured to facilitate the main flow through the converging fluid inlet section and the throat portion towards the diverging fluid outlet section, and wherein the central body comprises a central body outlet directed towards the throat portion and configured to add a central flow towards the throat portion.

2. The fluid separator of claim 1, wherein the central flow substantially coincides with the central axis and is surrounded by the main flow.

3. The fluid separator of claim 1, wherein the central body has a substantially circular shape in a cross-axial dimension and comprises a nose section disposed upstream of the swirl imparting device, the nose section having a diameter that gradually increases, the degree of diameter increase gradually decreasing in a downstream direction, and wherein the central body further comprises a section disposed downstream of the swirl imparting device, the section having a diameter that gradually decreases in the downstream direction.

4. The fluid separator of claim 1, wherein the central body outlet comprises a central body outlet swirl imparting device for creating a swirling motion of the central flow within at least part of the fluid separator.

5. The fluid separator of claim 4, wherein the central body outlet swirl imparting device comprises a plurality of swirl imparting vanes, a turbine or a tangential inlet.

6. The fluid separator of claim 1, wherein the outer secondary outlet is connected to a gas-liquid reservoir from which a fluid flow is guided to the central body outlet to form the central flow.

7. The fluid separator of claim 6, wherein the gas-liquid reservoir is configured to be heated.

8. The fluid separator of claim 6, wherein the gas-liquid reservoir comprises means to separate a liquid fraction from a gas fraction.

9. The fluid separator of claim 6, wherein the outer secondary outlet is connected tangentially to a perimeter of the gas-liquid reservoir to create a vortex flow inside the gas-liquid reservoir.

10. The fluid separator of claim 6, wherein the central body outlet is configured to operate at a first pressure and the outer secondary outlet is configured to operate at a second pressure, the first pressure being lower than the second pressure.

11. The fluid separator of claim 1, wherein the central body further comprises a second inlet facing an upstream direction, from which a fluid flow is guided to the central body outlet to form the central flow.

12. The fluid separator of claim 11, wherein the second inlet is disposed in a nose section of the central body.

13. The fluid separator of claim 1, wherein the central body is mounted to the housing by a plurality of spokes.

14. The fluid separator of claim 1 further comprising a flow straightening device mounted to the housing.

15. The fluid separator of claim 1, wherein the outer secondary outlet is connected to a gas-liquid reservoir from which a fluid flow is guided to the central body outlet to form the central flow, and wherein the central body is mounted to the housing by a plurality of spokes, and wherein the fluid flow is guided to the central body outlet via a duct that enters the central body via at least one of the plurality of spokes.

16. The fluid separator of claim 1, wherein the central flow comprises at least one of an absorbent medium and a coolant medium.

17. The fluid separator of claim 1 wherein the fluid comprises solid particles.

18. A method for separating a fluid, the method comprising the steps of:

providing a fluid separator, the fluid separator comprising a throat portion which is disposed between a converging fluid inlet section and a diverging fluid outlet section, the diverging fluid outlet section comprising an inner primary outlet for condensables depleted fluid components and an outer secondary outlet for condensables enriched fluid components; a central body disposed upstream of the throat portion and in the converging fluid inlet section, the central body being disposed substantially coaxial to a central axis of the fluid separator, wherein the central body has a largest outer width or diameter which is larger than a smallest inner width or diameter of the throat portion; and a swirl imparting device for creating a swirling motion of a main flow within at least part of the fluid separator, wherein the fluid separator further comprises a housing in which the central body is disposed such that an annulus is present between an inner surface of the housing and an outer surface of the central body, wherein the fluid separator is configured to facilitate the main flow through the converging fluid inlet section and the throat portion towards the diverging fluid outlet section, and wherein the central body comprises a central body outlet directed towards the throat portion and configured to add a central flow towards the throat portion;

providing a first fluid to form the main flow; and providing a second fluid to form the central flow.

19. The method for separating a fluid of claim 18, wherein the second fluid comprises at least one of an absorbent medium and a coolant medium.

\* \* \* \* \*